United States Patent Office 2,730,169
Patented Jan. 10, 1956

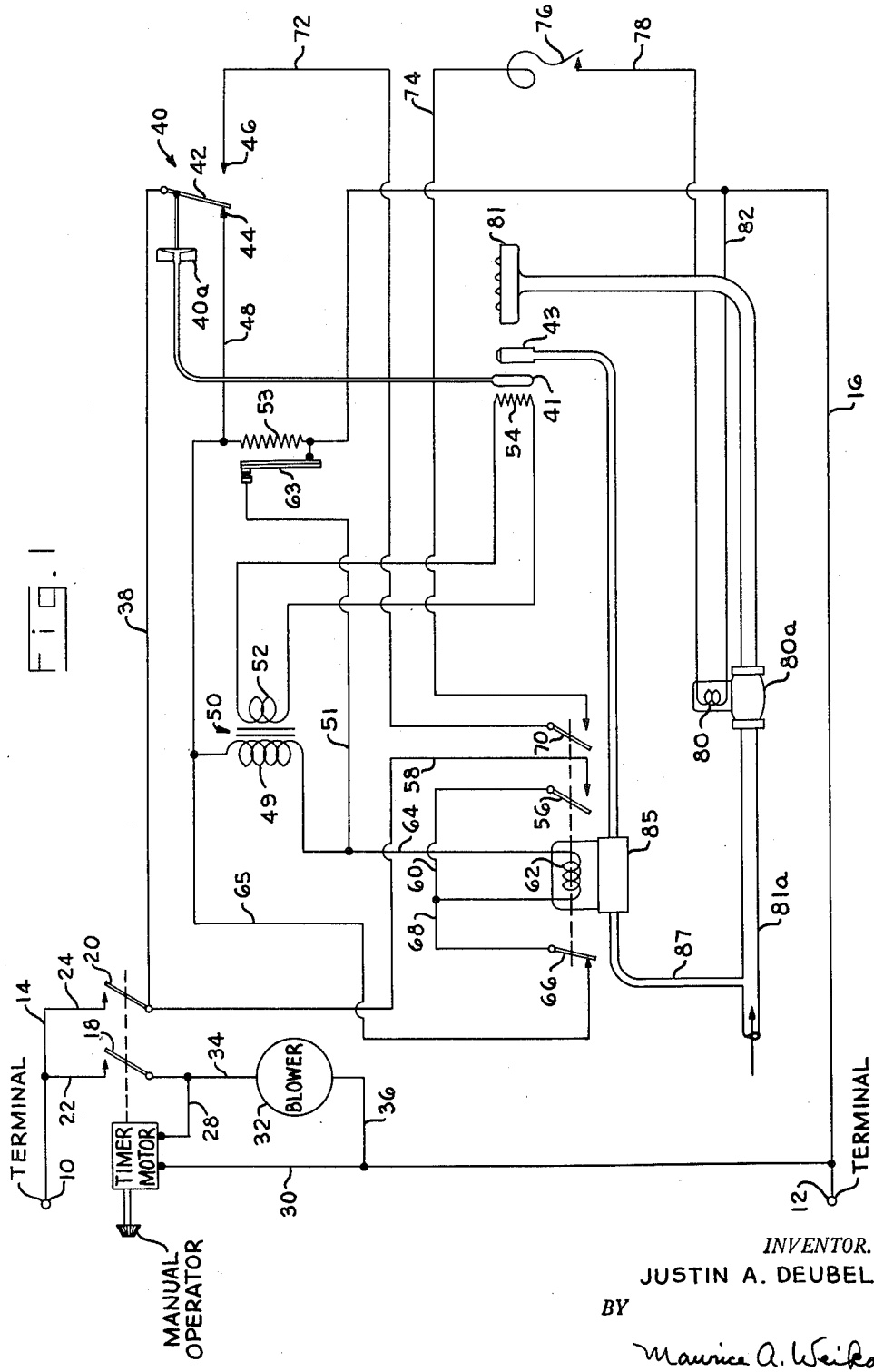

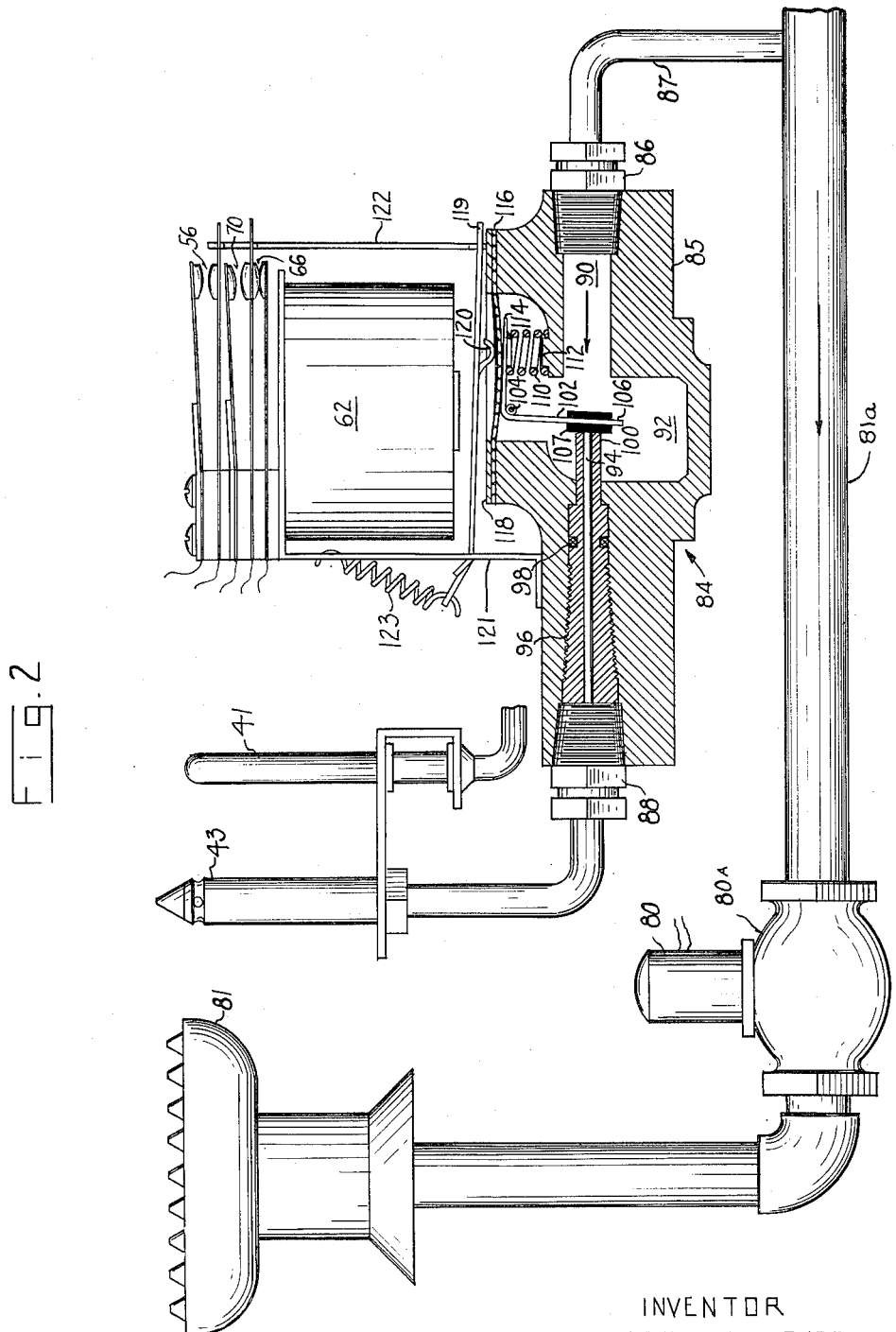

2,730,169

GAS BURNER CONTROL SYSTEM

Justin A. Deubel, Milwaukee, Wis., assignor, by mesne assignments, to General Controls Co., a corporation of California Application November 6, 1950, Serial No. 194,293

8 Claims. (Cl. 158—125)

This invention relates to a control system and instrumentalities especially adapted to the control of gas burner systems.

Particularly, it concerns a control system for a gas burner wherein the main gas supply valve, pilot ignition and the pilot valve are controlled by a plurality of control means including a thermostat, a condition responsive switch and a timing means.

It is an object of this invention to provide a timed operation of a gas burner within temperature limits whereby a high degree of regulation is obtained. More specifically, the invention provides a cycle of operation initiated by a manual setting of time and temperature wherein control of a heating operation is obtained over a predetermined period of time within desired temperature limits and with property safety precautions.

It is an object of this invention to provide a control circuit and means for operating a gas clothes dryer to accomplish control of the drying operation with maximum safety, whereby a manual setting and starting operation is required to provide individual and varied modes of operation. The conventional gas clothes dryer consists of a gas burner installed in a cabinet containing a heated chamber having a revolving or reciprocating drum containing the clothes to be dried; the burner must, therefore, function for varying periods of time and temperature depending upon the type of clothes, amount of moisture, relative humidity in the room, etc.

This invention provides the high and versatile degree of control necessary for successful gas dryer application but is not limited to that precise application as it may be applied to other types of heating systems. It is therefore intended that this description refers to merely a specific embodiment of this invention and is to be limited only by the scope of the appended claims.

This invention further provides the inclusion of a novel pilot gas valve having a direct functional relationship with certain electrical switching apparatus in the control circuit.

In the accompanying drawings, Fig. 1 is a schematic wiring diagram illustrating the electrical relationships of the gas burner control system, and Fig. 2 is a plan view of burner components showing the pilot valve in section.

In Fig. 1, numerals 10 and 12 indicate terminals connecting supply lines 14 and 16, respectively with a source of electric power, for example a 110 volt supply line. The circuit illustrated is an across-the-line type of circuit diagram wherein the electrical components are shown in their relationship to the power source to better illustrate the sequence of operation.

A control switch 18 and a control switch 20 are shown connected to a power line 14 by means of wires 22 and 24, respectively. The switches 18 and 20 are manually operated to the closed position which at the same time sets a timed period for operation of the timer motor 26. The switches 18 and 20 are opened automatically by the timer motor 26 upon completion of the pre-set time period. The switches 18 and 20 and timer motor 26 are integrated into a timer control (not shown) which permits switches 18 and 20 to be manually closed and automatically reopened a timed period later by the timer motor 26. As shown, the timer motor 26 is connected on one side by wire 28 to the switch 18 and on the other side by wire 30 to the power line 16. A blower 32 is connected in parallel circuit with the timer motor 26 by wires 34 and 36 and provide a means for circulating the heated air in the clothes-drying chamber.

A wire 38 connects a pilot ignition responsive switching mechanism comprising a double-throw single pole switch 40 with the switch 20. The switch 40 is actuated by a power element 40a operated by a condition responsive element 41 (Fig. 2) which responds to the presence or absence of a flame at the pilot burner 43. The switch arm 42 of switch 40 is shown in a closed position with a contact 44. This is the cold position of switch 40, indicating that the pilot burner 43 is not ignited. The switch arm 42 is shown in open contact position in relation to a contact 46. The contact 46 is engaged by the switch arm 42 when the condition responsive device 41 responds to the presence of flame at the pilot burner 43.

The contact 44 has a wire 48 connecting with the primary 49 of an ignition transformer 50. A wire 51 connects the other side of primary 49 with the power line 16 through a normally closed switch 63. The ignition transformer 50 has a low voltage secondary 52 which provides an ignition resistance 54 with a relatively high current. The hot wire resistance 54 which heats the gas to its ignition temperature is placed in proximity to the pilot burner 43.

A relay switch 56 is connected to wire 38 and switch 20 by means of a wire 58. The other side of relay switch 56 is connected by wire 60 to an electromagnetic means comprising a relay coil 62. The other side of relay coil 62 is connected by a wire 64 to the power line 16 through a normally closed switch 63. A wire 65, also connected with contact 44 of switch 40, is connected to a second relay switch 66. Relay switch 66 is connected by wire 68 to the relay coil 62. Wire 48 and wire 65 thus form a circuit network into which ignition transformer 49 and relay coil 62 are connected. A third relay switch 70 is connected by wire 72 to the contact 46 of switch 40. The relay switches 56, 66, and 70 are operated simultaneously (from the position shown to their alternate positions) by energization of relay coil 62. Upon de-energization of relay coil 62, the relay switches 56, 66, and 70 return to the positions shown. The physical operation of switches 56, 66, and 70 in conjunction with relay coil 62 will be further discussed with the description of Figure 2.

The circuit includes a thermal time delay switching mechanism comprising a warp switch heater 53 and the switch 63, the heater 53 being connected directly between wire 48 and line wire 16, and the switch 63, which is opened upon heating of the heater 53 a predetermined amount, is connected in the energizing circuit of relay coil 62 and the ignition transformer 50.

The other side of relay switch 70 is connected by wire 74 to a thermostat 76. The thermostat 76 is responsive to the temperature of the clothes drying chamber and is capable of manual adjustment over a range of temperature values. The thermostat 76 is connected by a wire 78 to an electromagnetic means comprising a solenoid coil 80 which operates a main valve 80A (Fig. 2) to control the flow of gas, through a main gas supply conduit 81a to the main burner 81. The other side of the solenoid coil 80 is connected by wire 82 to the power line 16. The contact 46, wire 72, switch 70, wire 74, thermostat 76 and wire 78 thus form a circuit for the solenoid coil 80.

As shown in Fig 2 and indicated generally at 84 is a side sectional view of a pilot gas valve having a body portion 85 with a gas inlet opening 86 and a gas outlet opening 88. The inlet opening 86 is connected by suitable piping 87 to a source of gas supply such as main gas supply conduit 81a. The outlet opening 88 is connected to the pilot burner 43, located in proximity to the main burner 81, in a manner customary in gas burner systems. The relay coil 62 which operates the relay switches 56, 66, and 70, also serves to control the operation of the pilot valve 84 in a manner to be hereinafter described. The body portion 85 is provided with a passage 90 connecting the inlet opening 86 with a valve chamber 92. The outlet opening 88 is connected with the valve chamber 92 through a restricted gas passage or orifice 94 in a spud 96. The spud 96 is screw-threaded into the body portion 85 and is provided with a gasket or O-ring 98. The spud 96 has a nozzle portion 100 extending into the valve chamber 92 for engagement with a valve lever 102. The L-shaped lever 102 is mounted on a pivot pin 104 secured in the body portion 85. The lever 102, which is rotatably moveable about the pivot 104, has an arm 106 extending vertically in proximity to the nozzle 100. Resilient means such as a rubber pad 107, fastened to the vertical arm 106, serves to seal and cushion the nozzle 100 when the vertical arm 106 is directed against the nozzle 100. A compression spring 110 is mounted on a boss 112 formed in the body 85. At its upper end, the spring 110 is retained against the horizontal arm 114 of lever 102 and serves to bias the lever 102 in a counterclockwise direction about the pivot 104. The resilient diaphragm 116, retained against the body portion 85 by a retaining disk 118, seals the chamber 92. The purpose of the diaphragm 116 is to permit the arm 114 of level 102 to be moved by force applied externally of the pilot valve 84. An armature member 119 is pivotally mounted on a bracket 121 and spring biased by a spring 123 in a downward direction but moveable upwardly upon energization of relay coil 62. The spring 123 is secured at one end to the bracket 121 and at its other end to the end of member 119. An extension 120 on the armature member 119 bears against the diaphragm 116 and underlying arm 114 to bias the pilot valve to the closed position, as shown. The armature 119 cooperates with the relay coil 62 in a manner similar to conventional relays and other electromagnetic devices. A bar 122 is shown in operative relationship with the armature member 119; movement of bar 122 upwardly upon energization of relay coil 62 serves to actuate the switches 56, 66, and 70 from the positions shown in Fig. 2 to the positions where switch 56 is closed, switch 66 is opened and switch 70 is closed, and the operation is sequential in the order mentioned.

*Operation*

Assuming that a temperature of 200° F. for a period of thirty minutes is required, the thermostat 76 may be manually set to a reading of 200° F. and the timer motor to a reading of thirty minutes to initiate operation of the dryer. Setting of the thermostat 76 to any temperature above room temperature automatically closes the thermostat contacts. The manual setting of the timer period to any value beyond zero results in closure of switches 18 and 20. After the elapse of the set time period, thirty minutes, the timing motor automatically opens the switches 18 and 20, thus deenergizing the entire dryer circuit, including the timer motor circuit. Thus the switches 18 and 20 are manually closed and automatically opened.

After the setting has been made, the closure of switch 18 has energized the timer motor circuit as follows: line 14, wire 22, switch 18, wire 28, timer motor 26, wire 30, and line 16. Switch 18 has also energized the blower circuit through line 14, wire 22, switch 18, wire 34, blower 32, wire 36 and line 16.

The closure of switch 20 energizes the pilot ignition circuit as follows: line 14, wire 24, switch 20, wire 38, switch arm 42 of switch 40, contact 44, wire 48, primary 49, wire 51, switch 63 and line 16, similarly the heater 53 is energized. The closure of switch 20 also energizes the relay circuit as follows: line 14, wire 24, switch 20, wire 38, switch arm 42 of switch 40, contact 44, wire 65, normally closed relay switch 66, wire 68, relay coil 62, wire 64, switch 63, and line 16. Energization of relay 62 results in the attraction of armature member 119 upwardly against the bias of its spring. The upward movement of armature member 119 and extension 120 permits the spring 110 to exert a force in an upward direction against the horizontal arm 114, pivoting the L-shaped lever 102 in a counterclockwise direction. This movement of lever 102 carries vertical arm 106 away from the nozzle 100, opening the pilot gas valve. The gas entering the opening 86 passes through passage 90 into chamber 92 and flows through the orifice 94, and out the opening 88 to the pilot burner 43, where it is ignited by the hot wire resistance 54.

The energization of relay 62 results in the closure of relay switch 56 which completes a holding circuit for the relay 62 around the switch 66. The relay switches 56 and 66 overlap so that switch 56 is closed before switch 66 is opened upon energization of the relay.

Energization of relay 62 also results in the closure of relay switch 70 to prepare the main gas supply circuit for energization. With combustion initiated at the pilot burner, the double-throw switch 40 will be moved from the cold position shown, to its hot position thereby closing the circuit through contact 46. This switching action completed energization of the main gas supply circuit which may be traced as follows: power line 14, wire 24, switch 20, wire 38, switch arm 42, contact 46, wire 72, relay switch 70, wire 74, thermostat 76, wire 78, solenoid coil 80, wire 82 and line 16. The energization of solenoid coil 80 opens the solenoid gas supply valve 80A to the main burner 81. The pilot flame ignites the gas flowing from the main burner. The movement of switch 40 from the position shown to this new position also results in deenergization of the pilot ignition circuit heretofore described and deenergization of heater 53. In normal operation heater 53 is thus deenergized before it can open switch 63.

The main burner provides heat from the clothes drying chamber until the temperature of the chamber reaches 200° F. (the pre-set temperature) at which point the thermostat 76 opens its contacts. This results in deenergization of the main gas supply circuit and the closure of the main gas supply valve 80A because of the deenergization of coil 80. With the closing of the main valve 80A the drying chamber temperature begins to fall whereupon the thermostat 76 recloses its contacts. This reenergizes the main gas supply circuit and the solenoid coil 80 to again open the main valve 80A. The pilot flame again ignites the gas issuing from the main burner. This action brings the chamber temperature back to the pre-set temperature of 200° F. The thermostat cycles independently of the time period set into the timer and may occur several times during the timed period. The thermostat serves to maintain the proper temperature level for the duration of the timed period. After the thirty minutes time period has elapsed, the timer motor 26 actuates the switches 18 and 20 to their open contact position, shutting down the entire system.

In the event that the pilot burner 43 is not ignited, the pilot responsive switch 40 remains in the position shown and the main gas supply circuit cannot be energized.

Where a gas burner control system, such as that described above, is applied to a gas clothes dryer or other gas burning appliance, it is important that the control of the burner be such that no eccentric or irregular operating sequence of either the timer manual control or the thermostat can possibly produce an unsafe condition in the apparatus. For example, the manual timer control may be set for a timed period. After the main burner is on the timer control might be turned to off position and then immediately back to on. In the control system described, under these conditions, though the switch 40 remains in its hot position for a short time, when the switches 18 and 20 are re-closed, the main burner supply valve 80A will not be reenergized to permit unignited gas to leave the main burner. Since relay coil 62 is deenergized and cannot be reenergized until switch 40 has assumed its cold position, the switch 70 remains in the open position and the main burner supply valve 80A cannot therefore be re-opened by the coil 80 until the ignition cycle has been completed and switch 40 has again reached its hot position.

If upon setting the timer to start a drying operation, the pilot should fail to ignite, the switch 40 will, of course, not move to its hot position and the main burner supply valve will remain closed since the solenoid 80 will remain deenergized. Under these conditions, after a period measured by the time required to cause heater 53 to open switch 63, the switch 63 will be opened deenergizing relay 62 and ignition transformer 50 and shutting off the flow of gas to the pilot burner.

While a single embodiment of the invention has been shown, it will be apparent that numerous changes may be made without departing from the spirit and scope of the invention. The invention therefore is to be limited only by the appended claims.

What is claimed is:

1. Control apparatus for a main burner, including a pilot burner, an igniter for the pilot burner, an electromagnetically operated main valve controlling the flow of fuel to said main burner, a pilot valve controlling the flow of fuel to said pilot burner, an electromagnetically operated switching mechanism, electromagnetic means for operating said switching mechanism and said pilot valve, a single pole-double throw pilot ignition responsive switching mechanism moveable from a cold to a hot position upon the establishment of flame at the pilot burner, and circuit means connecting said igniter and said electromagnetic means in a circuit network for concurrent energization thereof, a circuit for said main valve operator, control switch means connecting both said circuit network and said main valve operator circuit across a source of power, a portion of said pilot ignition responsive switching mechanism having contacts closed when said mechanism is in cold position, said contacts being connected in series with said circuit network, and contacts open when said mechanism is in cold position connected in circuit with said main valve operator, and circuit means preventing said main valve from reopening upon momentary deenergization of said electromechanism means while said pilot ignition responsive switching mechanism remains in hot position, said last mentioned circuit means including a normally open switch of said electromagnetically operated switch mechanism controlling energization of said main valve operator and a normally open switch of said electromagnetically operated switch mechanism shunting said closed cold contacts of the pilot ignition responsive switch mechanism.

2. Control apparatus for a main burner, including a pilot burner, an igniter for the pilot burner, an electromagnetically operated main valve controlling the flow of fuel to said main burner, a pilot valve controlling the flow of fuel to said pilot burner, an electromagnetically operated switching mechanism, electromagnetic means for operating said switching mechanism and said pilot valve, a pilot ignition responsive switching mechanism moveable from a cold to a hot position upon the establishment of flame at the pilot burner, and circuit means connecting said igniter and said electromagnetic means in a circuit network for concurrent energization thereof, a circuit for said main valve operator, control switch means connecting both said circuit network and said main valve operator circuit across a source of power, a portion of said pilot ignition responsive switching mechanism having contacts closed when said mechanism is in cold position, said contacts being connected in series with said circuit network, and contacts open when said mechanism is in cold position connected in circuit with said main valve operator, circuit means preventing said main valve from reopening upon momentary deenergization of said electromagnetic means while said pilot ignition responsive switching mechanism remains in hot position, said last mentioned circuit means including a normally open switch of said electromagnetically operated switch mechanism controlling energization of said main valve operator and a normally open switch of said electromagnetically operated switch mechanism shunting said closed cold contacts of the pilot ignition responsive switch mechanism, and safety means for deenergizing the igniter and said electromagnetic means if said pilot ignition responsive switching means fails to move from its cold to its hot position within a predetermined time after initial closure of said control switch means, said safety means including a normally closed time delay switch connected in series with said circuit network.

3. Control apparatus for a main burner, including a pilot burner, an igniter for the pilot burner, an electromagnetically operated main valve controlling the flow of fuel to said main burner, a pilot valve controlling the flow of fuel to said pilot burner, an electromagnetically operated switching mechanism, electromagnetic means for operating said switching mechanism and said pilot valve, a pilot ignition responsive switching mechanism moveable from a cold to a hot position upon the establishment of flame at the pilot burner, and circuit means connecting said igniter and said electromagnetic means in a circuit network for concurrent energization thereof, a circuit for said main valve operator, control switch means connecting both said circuit network and said main valve operator circuit across a source of power, a portion of said pilot ignition responsive switching mechanism having contacts closed when said mechanism is in cold position, said contacts being connected in series with said circuit network, and contacts open when said mechanism is in cold position connected in circuit with said main valve operator, circuit means preventing said main valve from reopening upon momentary deenergization of said electromagnetic means while said pilot ignition responsive switching mechanism remains in hot position, said last mentioned circuit means including a normally open switch of said electromagnetically operated switch mechanism controlling energization of said main valve operator and a normally open switch of said electromagnetically operated switch mechanism shunting said closed cold contacts of the pilot ignition responsive switch mechanism, and safety means for deenergizing the igniter and said electromagnetic means if said pilot ignition responsive switching means fails to move from its cold to its hot position within a predetermined time after initial closure of said control switch means, said safety means including a thermal time delay switching mechanism comprising a normally closed switch connected in series with said circuit network and a heater for moving said switch to open position after a predetermined time period, the heater being controlled jointly by said control switch means and the closed cold contacts of said pilot ignition responsive switching mechanism.

4. Control apparatus for a main burner, including a pilot burner, an electromagnetically operated main valve controlling the flow of fuel to said main burner, a pilot valve controlling the flow of fuel to said pilot burner, an electromagnetically operated switching mechanism, electromagnetic means for operating said switching mechanism and said pilot valve, a single pole-double throw pilot ignition responsive switching mechanism moveable from a cold to a hot position upon the establishment of flame at the pilot burner, and circuit means connecting said igniter and said electromagnetic means in a circuit network for concurrent energization thereof, a circuit for said main valve operator, control switch means connecting both said circuit network and said main valve operator circuit across a source of power, a portion of said pilot ignition responsive switching mechanism having contacts closed when said mechanism is in cold position, said contacts being connected in series with said circuit network, and contacts open when said mechanism is in cold position connected in series with said main valve operator, a thermostat responsive to the temperature of an area heated by said main burner controlling the circuit for the main valve operator, and circuit means preventing said main valve from reopening upon momentary deenergization of said electromagnetic means while said pilot ignition responsive switching mechanism remains in hot position and while said thermostat remains closed, said last mentioned circuit means including a normally open switch of said electromagnetically operated switch mechanism controlling energization of said main valve operator and a normally open switch of said electromagnetically operated switch mechanism shunting said closed cold contacts of the pilot ignition responsive switch mechanism.

5. Control apparatus for a burner system, including a pilot burner, an igniter for the pilot burner, an electromagnetically operated main valve controlling the flow of fuel to a main burner, a pilot valve controlling the flow of fuel to said pilot burner, an electromagnetically operated switching mechanism, electromagnetic means for operating said switching mechanism and said pilot valve, a single pole-double throw pilot ignition responsive switching mechanism movable from a cold to a hot position upon the establishment of flame at the pilot burner, and circuit means connecting said igniter and said electromagnetic means in a circuit network for concurrent energization thereof, a circuit for said main valve operator, control switch means connecting both said circuit network and main valve operator circuit across a source of power, a portion of said pilot ignition responsive switching mechanism having contacts closed when said mechanism is in cold position, said contacts being connected in series with said circuit network, and contacts open when said mechanism is in cold position connected in circuit with said main valve operator, circuit means preventing said main valve from reopening upon momentary deenergization of said electromagnetic means while said pilot ignition responsive switching mechanism remains in hot position, said last mentioned circuit means including a normally open switch of said electromagnetically operated switching mechanism controlling energization of said main valve operator and a normally open switch of said electromagnetically operated switching mechanism shunting said closed cold contacts of the pilot ignition responsive switch mechanism, safety means for deenergizing the igniter and said electromagnetic means if said pilot ignition responsive switching means fails to move from its cold to its hot position within a predetermined time after initial closure of said control switch means, said safety means including a normally closed time delay switch connected in series with said circuit network.

6. Control apparatus for a burner system, including a pilot burner, a main burner, an igniter for the pilot burner, an electromagnetically operated main valve controlling the flow of fuel to said main burner only, a pilot valve controlling the flow of fuel at least to said pilot burner, a switching mechanism, a single electromagnetic means for operating both said switching mechanism and said pilot valve, a single pole double-throw pilot ignition responsive switching device movable from a cold to a hot position upon the establishment of flame at the pilot burner, and circuit means connecting said igniter and said electromagnetic means in a circuit network for concurrent energization thereof, a circuit for said main valve operator, control switch means connecting both said circuit network and main valve operator circuit across a source of power, a portion of said pilot ignition responsive switching device having contacts closed when said device is in cold position, said last mentioned contacts being connected in series with said circuit network, and contacts closed when said device is in hot position connected in circuit with said main valve operator, circuit means preventing said pilot valve from reopening upon momentary deenergization of said electromagnetic means while said pilot ignition responsive switching mechanism remains in hot position, said last mentioned circuit means including a normally open and a normally closed switch of said switching mechanism, said last mentioned normally closed switch being connected in series with said electromagnetic means and with said closed cold contacts of said ignition responsive switching device, the normally open contacts of said circuit means being connected in parallel around the closed cold contacts of said ignition responsive switching device, safety means for deenergizing the igniter and said electromagnetic means if said pilot ignition responsive switching device fails to move from its cold to its hot position within a predetermined time after initial closure of said control switch means, said safety means including a normally closed time delay switch connected in series with said circuit network.

7. Control apparatus for a burner system, including a pilot burner, a main burner, an igniter for the pilot burner, an electromagnetically operated main valve controlling the flow of fuel to said main burner only, a pilot valve controlling the flow of fuel at least to said pilot burner, a switching mechanism, a single electromagnetic means for operating both said switching mechanism and said pilot valve, a single pole double-throw pilot ignition responsive switching device movable from a cold to a hot position upon the establishment of flame at the pilot burner, and circuit means connecting said igniter and said electromagnetic means in a circuit network for concurrent energization thereof, a circuit for said main valve operator, control switch means connecting both said circuit network and main valve operator circuit across a source of power, a portion of said pilot ignition responsive switching device having contacts closed when said device is in cold position, said last mentioned contacts being connected in series with said circuit network, and contacts closed when said device is in hot position connected in circuit with said main valve operator, circuit means preventing said pilot valve from reopening upon momentary deenergization of said electromagnetic means while said pilot ignition responsive switching mechanism remains in hot position, said last mentioned circuit means including a normally open and a normally closed switch of said switching mechanism, said last mentioned normally closed switch being connected in series with said electromagnetic means and with said closed cold contacts of said ignition responsive switching device, the normally open contacts of said circuit means being connected in parallel around the closed cold contacts of said ignition responsive switching device, and safety means for deenergizing the igniter and said electromagnetic means if said pilot ignition responsive switching device fails to move from its cold to its hot position within a predetermined time after initial closure of said control switch means, said safety means including a normally closed time delay switch connected in series with said circuit network.

8. Control apparatus for a burner system, including a pilot burner, a main burner, an igniter for the pilot burner, an electromagnetically operated main valve controlling the flow of fuel to said main burner only, a pilot valve controlling the flow of fuel at least to said pilot burner, a switching mechanism, electromagnetic means for operating said switching mechanism and said pilot valve, a single pole double-throw pilot ignition responsive switching device movable from a cold to a hot position upon the establishment of flame at the pilot burner, and circuit means connecting said igniter and said electromagnetic means in a circuit network for concurrent energization thereof, a circuit for said main valve operator, control switch means connecting both said circuit network and main valve operator circuit across a source of power, a portion of said pilot ignition responsive switching device having contacts closed when said device is in cold position, said last mentioned contacts being connected in series with said circuit network, and contacts closed when said device is in hot position connected in circuit with said main valve operator, circuit means preventing said pilot valve from reopenng upon momentary deenergization of said electromagnetic means while said pilot ignition responsive switching mechanism remains in hot position, said last mentioned circuit means including a normally open and a normally closed switch of said switching mechanism, said last mentioned normally closed switch being connected in series with said electromagnetic means and with said closed cold contacts of said ignition responsive switching device, the normally open contacts of said circuit means being connected in parallel around the closed cold contacts of said ignition responsive switching device, and safety means for deenergizing the igniter and said electromagnetic means if said pilot ignition responsive switching device fails to move from its cold to its hot position within a predetermined time after initial closure of said control switch means, said safety means including a normally closed time delay switch connected in series with said circuit network.

References Cited in the file of this patent

UNITED STATES PATENTS

| | | |
|---|---|---|
| 2,055,384 | Meacham | Sept. 22, 1936 |
| 2,125,473 | Vaughan | Aug. 2, 1938 |
| 2,189,540 | Boerger | Feb. 6, 1940 |
| 2,200,908 | Beggs | May 14, 1940 |
| 2,269,157 | Levine | Jan. 6, 1942 |
| 2,408,673 | Moorhead | Oct. 1, 1946 |
| 2,456,147 | Ray | Dec. 14, 1948 |